United States Patent [19]

Boshek, Jr.

[11] Patent Number: 5,143,209
[45] Date of Patent: Sep. 1, 1992

[54] AUTOMATIC EXTENSION CASSETTE CONTAINER

[75] Inventor: Ernest D. Boshek, Jr., San Jose, Calif.

[73] Assignee: Tandy Corporation, Fort Worth, Tex.

[21] Appl. No.: 683,910

[22] Filed: Apr. 11, 1991

[51] Int. Cl.⁵ .......................................... B65D 85/672
[52] U.S. Cl. .................................. 206/45.16; 206/387
[58] Field of Search .................. 206/817, 387, 45.13, 206/45.16, 45.25

[56] References Cited

U.S. PATENT DOCUMENTS

| | | |
|---|---|---|
| D. 223,739 | 5/1972 | Weiss et al. |
| D. 257,649 | 12/1980 | Belgin |
| 3,532,211 | 10/1970 | Gellert .......................... 206/387 |
| 3,743,374 | 7/1973 | Glass ........................... 206/387 X |
| 3,777,881 | 12/1973 | Schwartz . |
| 3,912,077 | 10/1975 | Krynicki ....................... 206/387 |
| 4,030,601 | 6/1977 | Ackeret ......................... 206/387 |
| 4,401,216 | 3/1983 | Koch ............................ 206/387 |
| 4,611,864 | 9/1986 | Yokota ........................ 206/387 X |
| 4,614,269 | 9/1986 | Dietze et al. . |
| 4,664,261 | 5/1987 | Frodelius ....................... 206/387 |
| 4,757,897 | 7/1988 | Huko . |
| 4,863,025 | 9/1989 | Wolf ............................. 206/387 |

Primary Examiner—Paul T. Sewell
Assistant Examiner—Jacob K. Ackun, Jr.
Attorney, Agent, or Firm—Townsend and Townsend

[57] ABSTRACT

A container (11) for storage of a tape cassette (19) uses a mechanism (17) which automatically lifts or extends the cassette at least partially from the container when opened, thereby providing easier access to the cassette. The pushing mechanism uses a driver bar (17) mounted on driver pins (33) and positioned near the back (45) of the cassette when the container is closed. As the cover (13) is opened, the driver pins (33) sweep an arc about a hinge (23) connecting the cover with a base (15), and the driver bar (17) mounted on the pins will push the cassette from its stored position to an extended position to provide enhanced access for the user. In other embodiments, the pushing mechanism can include an elongated driver pin (33a) without the driver bar (17); the pin sweeps out an arc and pushes the cassette to the extended position.

9 Claims, 2 Drawing Sheets

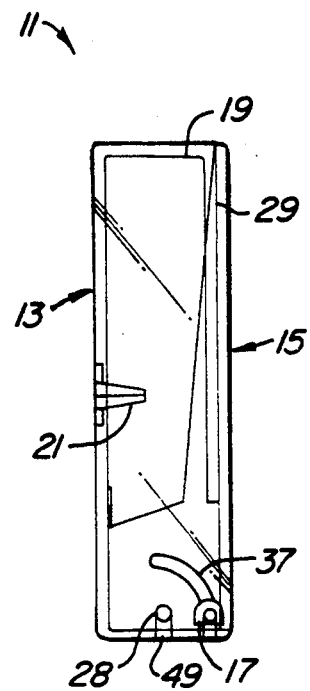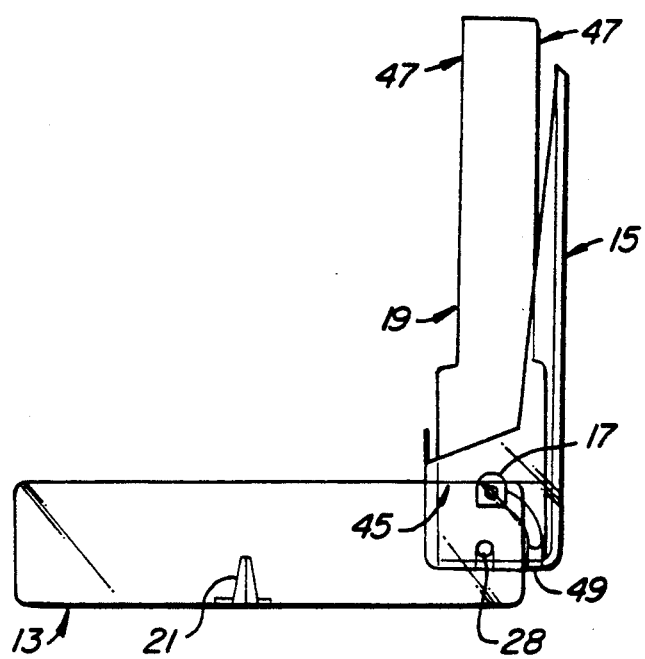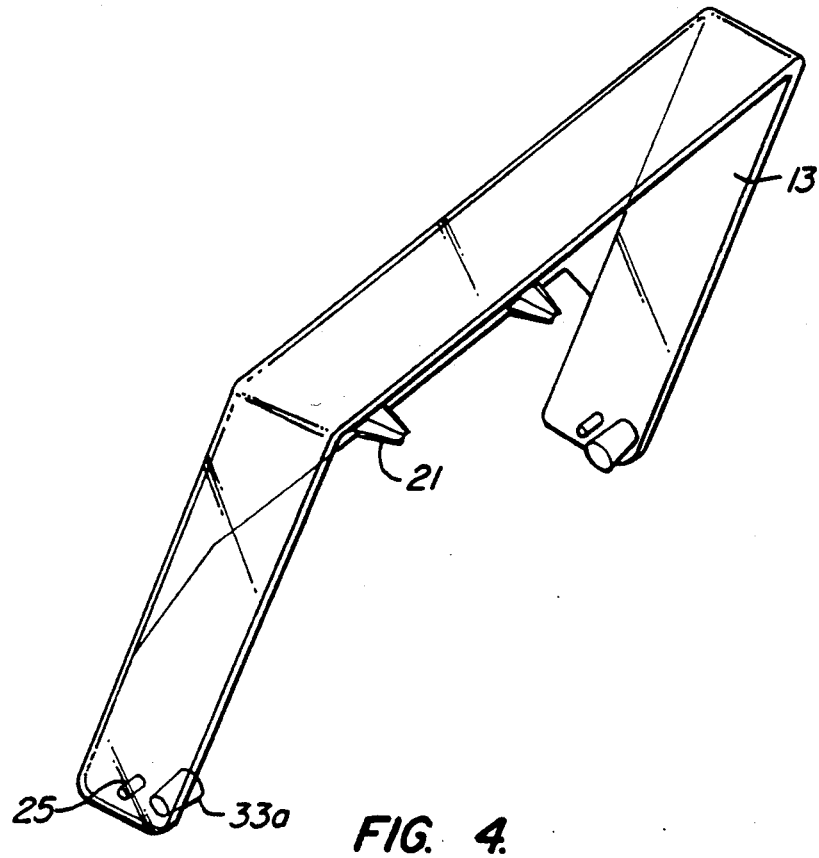

AUTOMATIC EXTENSION CASSETTE CONTAINER

BACKGROUND OF THE INVENTION

The present invention relates to a storage container for a tape reel device, e.g., a magnetic tape cassette, more particularly to a storage box which, when opened, lifts the enclosed cassette partly outside of the container so as to provide enhanced accessibility to a user.

Tape cassettes typically enclose magnetic tape on reels within a housing. Storage containers for magnetic tape cassettes, e.g., compact cassettes, video cassettes, data cassettes, film cassettes, and dictation cassettes, are well known. Containers for enclosing these cassettes are valuable in protecting the cassettes from damage and the enclosed magnetic media from contamination with dust or other foreign matter.

Although cassette containers are very useful, they are not always used. In some cases the cassettes are difficult to remove from the storage containers. This is especially a problem where the user has either large or small hands relative to the dimensions of the cassette. Inability to grasp the enclosed cassette often leads to frustration or difficulty in use of tape cassette storage containers with consequential failure to use the protective storage containers.

SUMMARY OF THE INVENTION

The present invention provides a cassette container which, upon opening, automatically mechanically extends the contained cassette. The mechanism pushes the cassette a sufficient distance to allow grasping the cassette. This mechanism thus improves the accessibility of the tape cassette for removal from the protective containers thereby leading to greater utilization of the storage containers and less damage to the cassettes themselves and to the media contained within the cassettes.

The present invention provides a container used to removably house a cassette, e.g., an audio tape cassette, therein. The container has a base portion and a cover portion which is movably attached to the base portion, typically with a hinge. The base portion and cover portion form an enclosure for the cassette, the cover portion being movable between a closed position and an open position. The container also provides a driving element which drives the cassette from a first, stored position within the enclosure to a second, extended position when the cover portion is moved from the closed position to the open position. This provides enhanced access to a cassette when at the second, extended position. In a preferred embodiment, the cassette driving element is carried by the cover portion. The driving element preferably includes a pair of pins and a driving member pivotally connected to the pins. The pins sweep an arc when the cover portion is opened causing the driving member to force the cassette to its extended position. Alternatively, the pins can be positioned and sized to contact the cassette directly and drive the cassette to its extended position.

In a preferred embodiment, the base portion has five sides, the cover portion has four sides, and the cover portion and base portion completely surround the cassette when the cover is in the closed position. Other container configurations are possible. Often the container will be provided with an enclosed cassette.

Other features and advantages of the invention will appear from the following description in which the preferred embodiments have been described in detail in conjunction with the accompanying drawings.

BRIEF DESCRIPTION OF THE DRAWINGS

FIG. 2 is a side view of the cassette container of FIG. 1 with the cover in the closed position and a cassette contained within the enclosure.

FIG. 3 illustrates the cassette container of FIG. 2 with the cover open and a cassette partly extended from the base, the extended cassette being more easily accessible for grasping by a user.

FIG. 4 illustrates an alternative embodiment of the invention with a direct pin driving mechanism.

DESCRIPTION OF THE PREFERRED EMBODIMENT

Figure 1:
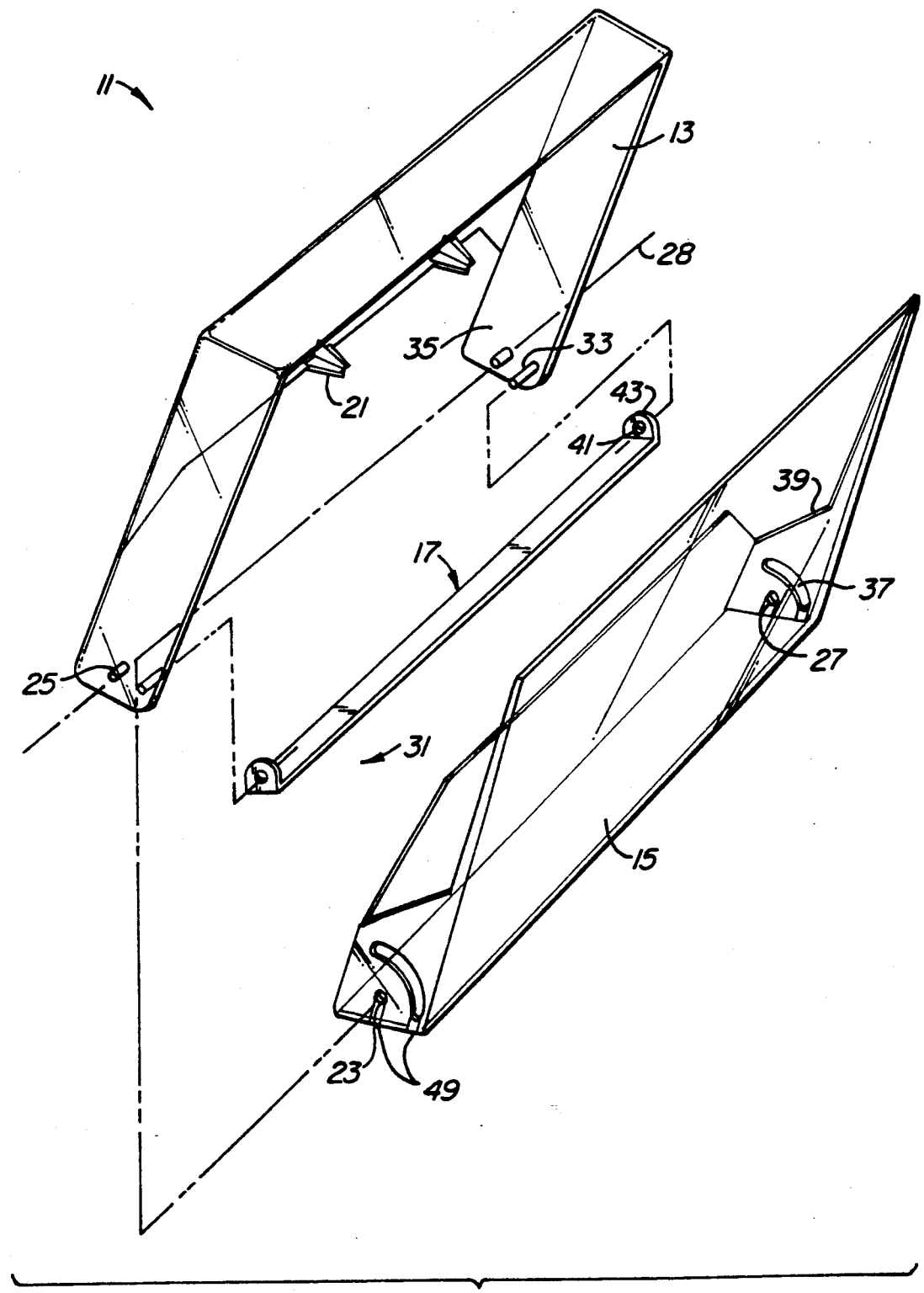
FIG. 1 illustrates an exploded isometric view of the preferred embodiment of the present invention.

Referring the reader to the drawings, FIG. 1 illustrates a cassette container 11, or audio album, having a cover 13, a base 15, and a lifter 17. The cover 13 makes up parts of four sides of the container 11. The cover 13 will usually be made of a plastic, e.g., crystal polystyrene, styrene, acrylonitrile-butadiene-styrene (ABS), styrene-acrylonitrile (SAN), and various moldable plastics. In some embodiments, the cover is an opaque plastic to prevent light damage to an enclosed cassette 19, while in others, it will be at least partially clear, allowing viewing its contents. Cover 13 also has a spool lock 21 which prevents tape spools of cassette 19 from unwinding.

The base 15 is a piece which makes up parts of three sides of container 11. Usually the base is made of plastic, e.g., crystal polystyrene, styrene, ABS, SAN, and various moldable plastics. Often base 15 will be made of a clear plastic which allows a user to see the contents of the container 11. The cover 13 is attached to the base 15 through a pin and hole hinge 23. A hinge pin 25 extends from appropriate positions on cover 13 into hinge holes 27 appropriately positioned on base 15. The pins 25 fit into the holes 27 and provide a pivotal axis. The cover 13 rotates about an axis defined by the pins 25 and holes 27 as it is opened and closed. The pins and holes may also be reversed so the holes are located on the cover, and the pins are on the base. Often the container 11 also contains a cardboard insert 29 useful to label the enclosed cassette 19.

The cassette container 11 also has a driver mechanism 31. The driver mechanism 31 includes a driver bar 17, e.g., a pan, dish, or rod, which bears against the cassette 19 when the cover 13 is being opened, as shown in FIG. 3. This mechanism 31 automatically extends contained cassette 19 out of container 11, thereby improving accessibility to the tape cassette from the cassette container.

Mechanism 31 includes pins 33 which extend from side walls 35 of cover portion 13 and pass through curved slots 37 formed in sidewall portions 39 of base 15. The driver bar 17 has holes 41 at its ends 43 by which driver 17 is attached to driver pins 33. Each driver pin 33 sweeps out an arc about the axis 28 of rotation of cover 13 as the cover is opened to a position as illustrated in FIG. 3. As the driver pins 33 sweep their arcs, the driver 17 pushes an enclosed cassette 19 from its original stored position of FIG. 2 to an extended position of FIG. 3, from which cassette 19 is more easily accessible to a user. Curved slots 37 will usually also limit the length of the arc that the driver pins 33 sweep and thereby prevent cover 13 from opening beyond a particular desired position. The pins and holes on the side walls and driver bar could be reversed.

FIG. 2 and FIG. 3 illustrate the operation of cassette container 11. In FIG. 2, the cover 13 is closed, and cover 13 and base 15 enclose a cassette 19. The album 11 has hinges 23 made up of hinge pins 25 which fit into hinge holes 27 which define an axis 28 of pivot which extends between pins 25 and holes 27 of cover 13 and base 15. Driver pins 33 which extend into the enclosure fit through a curved slot 37 and a driver bar 17 is mounted on the pins. Driver bar 17 directly bears against the cassette back 45. Curved slot 37 also limits how wide the cover will open so that when cassette 19 is slipped into base 15, back 45 bears against driver 17. As cassette 19 is pushed into base 15, cover 13 will close FIG. 3 illustrates the initial stage of this process, while FIG. 2 illustrates the final stage.

Curved slot 37 limits the range of opening of the cover 13 and also assures that cassette 19, when inserted, bears against driver 17. Thus, as cassette 19 is pushed into base 15 and cover 13 is closed, driver 17 allows cassette 19 to move from an extended position, as shown in FIG. 3, into the entirely enclosed position shown in FIG. 2.

In the removal operation, from the position shown in FIG. 2 with an entirely enclosed cassette 19, as cover 13 is opened, driver pin 33 sweeps out an arc, e.g., defined by curved slot 37, about hinge 23. As driver pin 33 sweeps, driver 17 mounted thereon also moves and bears against cassette 19. The cassette 19 is pushed to the extended position illustrated in FIG. 3. The extended cassette is more easily accessible to a user as she may grasp the cassette on both sides 47.

FIG. 4 illustrates an alternative embodiment where driver bar 17 is eliminated. Driver pin 33a, instead of serving as the pivot and mount for driver bar 17, acts as the driver. The driver pin 33a directly bears against the cassette back 45. Usually, pins 33a are long enough and are positioned to contact the cassette back 45. The pin 33a may have a larger or smaller diameter than pins 33. The shape of driver pin 33a will occasionally be modified to other than cylindrical shapes as appropriate for correct positioning within the enclosure and for contact with cassette 19. Various modifications to the cassette housing 19 may be also incorporated; e.g., housing 19 may be modified so as to cooperate with a particular driver means.

Having described the design of cassette container 11, or audio album, it will be understood that various different materials may be used to make the album. The most convenient material is one which is moldable and exhibits properties of high tensile strength and rigidity. Plastics satisfy these requirements, however, other materials may also be used. As indicated above, two important functions of a cassette container are to protect the cassette from mechanical damage, and to prevent damage to the magnetic media by accumulation of foreign matter, e.g., dust. Thus, a cassette container 11, or audio album, will usually be made of a material compatible with these two desired ends. Protection from magnetic disturbance or electrostatic buildup may also be desired, and may be provided, e.g., by impregnating the plastic with a conductive material or treatment with anti-electrostatic materials.

Plastic is a preferred material for making the audio albums. The processes for molding or shaping the plastic are well known. See, e.g., the McGraw-Hill Encyclopedia of Science and Technology (latest edition), McGraw-Hill, and Kirk-Othmer (latest edition) Encyclopedia of Chemical Technology, Wiley and Sons.

Other shaped covers and bases will occasionally be utilized, e.g., sides having different shapes or which interlock with one another to form lesser or greater portions of the container sides. Additional shape features may be provided to allow the containers to conveniently stack against one another.

The hinges will also be made in various other configurations or will be used at different positions on the container. Different hinge assemblies will also be used.

As an additional refinement, automated assembly processes will be accommodated by the incorporation of guidance assembly slots 49, see FIGS. 1, 2, and 3. These shallow slots are helpful in allowing the pins 25 and 33 to be guided into their respective holes by automated assembly machinery.

Although the present invention has been described in some detail by way of illustration and example for purposes of clarity and understanding, it will be apparent that certain changes and modifications may be practiced within the scope of the claims.

What is claimed is:

1. A container used to removably house a cassette therein comprising;

a base portion including a bottom having a front edge and a rear edge, a back extending upwardly form the bottom along the rear edge and a first partial top extending from the back and overlying a first portion of the bottom;

a cover portion pivotally attached to said base portion for pure rotational movement about a pivot axis, said base portion and said cover portion forming an enclosure for said cassette, said cover portion being pivotal between a closed position and an open position;

the cover portion including parallel sides, a front extending perpendicular to the sides and a second partial top extending from the sides and the front, the second partial top sized to overlie a second portion of the bottom;

a cassette driver extending from and movable with the sides, the cassette driver positioned spaced apart from the pivot axis so to engage and drive said cassette from a first, stored position within said enclosure to a second, extended position partially outside the enclosure when said cover portion is pivoted from said closed position to said open position, thereby providing enhanced access to a cassette when at said second, extended position.

2. A container of claim 1, wherein said cassette driver includes a pair of pins and a driving member connecting said pins.

3. A container of claim 2, wherein said cassette driver is pivotally connected to said pins.

4. A container of claim 1, wherein said cassette driver includes a pin which sweeps a curve centered about the pivot axis.

5. A container of claim 4, wherein said pin bears against said cassette.

6. A container of claim 1, wherein aid base portion and said cover portion are movably attached by a hinge, said hinge including pins extending from a chosen one of said base portion or cover portion and engaging holes in the other of said base portion or cover portion.

7. A container of claim 1, wherein said cover portion has a spool lock.

8. A container of claim 1, wherein said cassette is an audio tape cassette.

9. A container of claim 1, with an enclosed cassette.

* * * * *